US008630408B2

(12) United States Patent
Harata et al.

(10) Patent No.: US 8,630,408 B2
(45) Date of Patent: Jan. 14, 2014

(54) FOLDER TYPE TERMINAL COVER DEVICE

(75) Inventors: Tomohiro Harata, Seoul (KR); Sung Hoon Hong, Seoul (KR); Dong Hun Kim, Seoul (KR); Hyok Su Choi, Seoul (KR); Pil Won Kim, Seoul (KR); Dong Kyun Kim, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 129 days.

(21) Appl. No.: 13/290,188

(22) Filed: Nov. 7, 2011

(65) Prior Publication Data
US 2012/0111755 A1    May 10, 2012

(30) Foreign Application Priority Data

Nov. 8, 2010 (KR) .................. 10-2010-0110261

(51) Int. Cl.
*H04M 1/00* (2006.01)
*H04M 9/00* (2006.01)
*H04M 1/02* (2006.01)

(52) U.S. Cl.
CPC .......... *H04M 1/0214* (2013.01); *H04M 1/0202* (2013.01); *H04M 1/0283* (2013.01)
USPC ...................... 379/433.13; 379/437; 379/451

(58) Field of Classification Search
USPC ............... 379/433.11, 433.13, 437, 441, 447, 379/451; 455/575.1, 575.3; 361/679.26, 361/679.27
See application file for complete search history.

(56) References Cited

U.S. PATENT DOCUMENTS

2007/0019804 A1 * 1/2007 Kramer ................... 379/433.13

FOREIGN PATENT DOCUMENTS

KR        10-0796721        1/2008

* cited by examiner

*Primary Examiner* — Tuan D Nguyen
(74) *Attorney, Agent, or Firm* — Cha & Reiter, LLC

(57) ABSTRACT

A cover for covering a folder type terminal including a first frame, a second frame, and a hinge for rotatably connecting the first frame and the second frame, the folder type terminal cover device includes: a first outer cover for covering the first frame; a second outer cover for covering the second frame; and a hinge cover for covering the hinge and in which a separation distance from the hinge increases when the folder type terminal is unfolded from a folded state. Thereby, an appearance and grip impression of the folder type terminal can be improved, and when the folder type terminal is put on a table in an unfolded state, the folder type terminal can maintain a predetermined angle from a table plane without a separate device.

15 Claims, 11 Drawing Sheets ically, the folder type terminal cover device to be used.

FOLDER TYPE TERMINAL COVER DEVICE

CLAIM OF PRIORITY

This application claims priority under 35 U.S.C. §119 from Korean Patent Application No. 10-2010-0110261, filed in the Korean Intellectual Property Office on Nov. 8, 2010, the entire contents of which are incorporated herein in its entirety.

BACKGROUND OF THE INVENTION

1. Field of the Invention

The present invention relates to a folder type terminal cover device, and more particularly, to a folder type terminal cover device for preventing a user's hand from contacting a hinge of a folder type terminal.

2. Description of the Related Art

A folder type terminal such as a mobile phone and a laptop computer can be folded using a hinge for portability.

FIG. 1 is a perspective view illustrating a typical folder type terminal.

As shown, a folder type terminal 10 includes a first frame 11, second frame 12, and hinge 13 for rotatably connecting the first frame 11 and the second frame 12. In the folder type terminal 10 of FIG. 1, the first frame 11 and the second frame 12 have screens 14 and 15, respectively. Accordingly, the folder type terminal 10 has a symmetrical structure about a shaft of the hinge 13. The screens 14 and 15 may be a touch screen.

In the above folder type terminal, as a mechanical structure of the hinge is exposed to the outside, the folder type terminal has an undesirable appearance. Also, when a user holds the folder type terminal, such as an electronic book reader, the user's hand contacts the hinge area and thus the user receives an unpleasant grip sensation. Further, when the folder type terminal is put on a table in an unfolded state, the folder type terminal requires a separate device for maintaining a predetermined angle from a table plane.

SUMMARY OF THE INVENTION

The present invention provides a folder type terminal cover device that can provide an enhanced appearance and a more pleasant grip experience and maintain a predetermined angle with a table plane for an easier operation without using a separate device when the folder type terminal is put on a table.

In accordance with an aspect of the present invention, a folder type terminal cover device for covering a folder type terminal includes a first frame, a second frame, and a hinge for rotatably connecting the first frame and the second frame. The folder type terminal cover device comprises a first outer cover for covering the first frame, a second outer cover for covering the second frame, and a hinge cover for covering the hinge and in which a separation distance from the hinge increases when the folder type terminal is unfolded from a folded state.

BRIEF DESCRIPTION OF THE DRAWINGS

The above features and advantages of the present invention will be more apparent from the following detailed description in conjunction with the accompanying drawings, in which.

DETAILED DESCRIPTION

Figure 1:
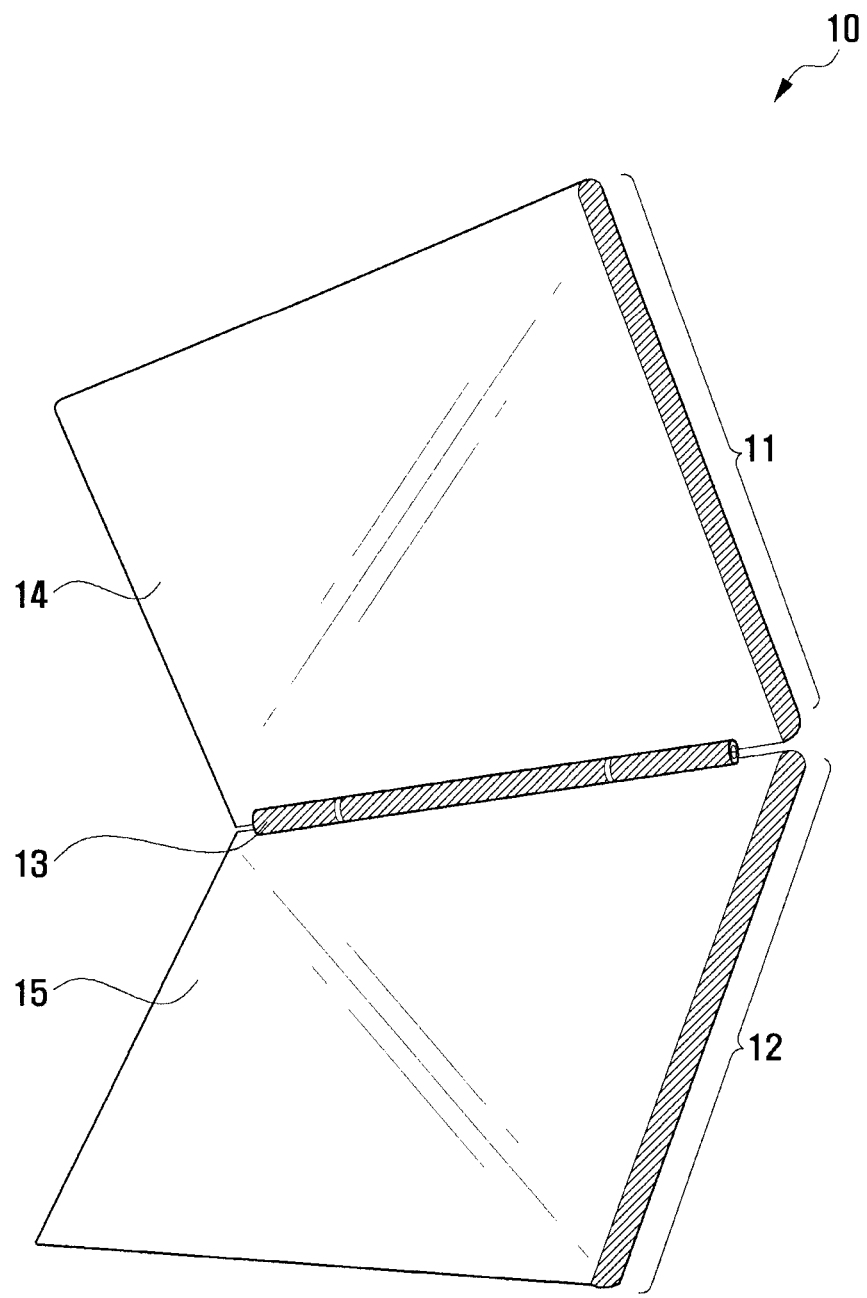
FIG. 1 is a perspective view illustrating a folder type terminal.
Figure 2:
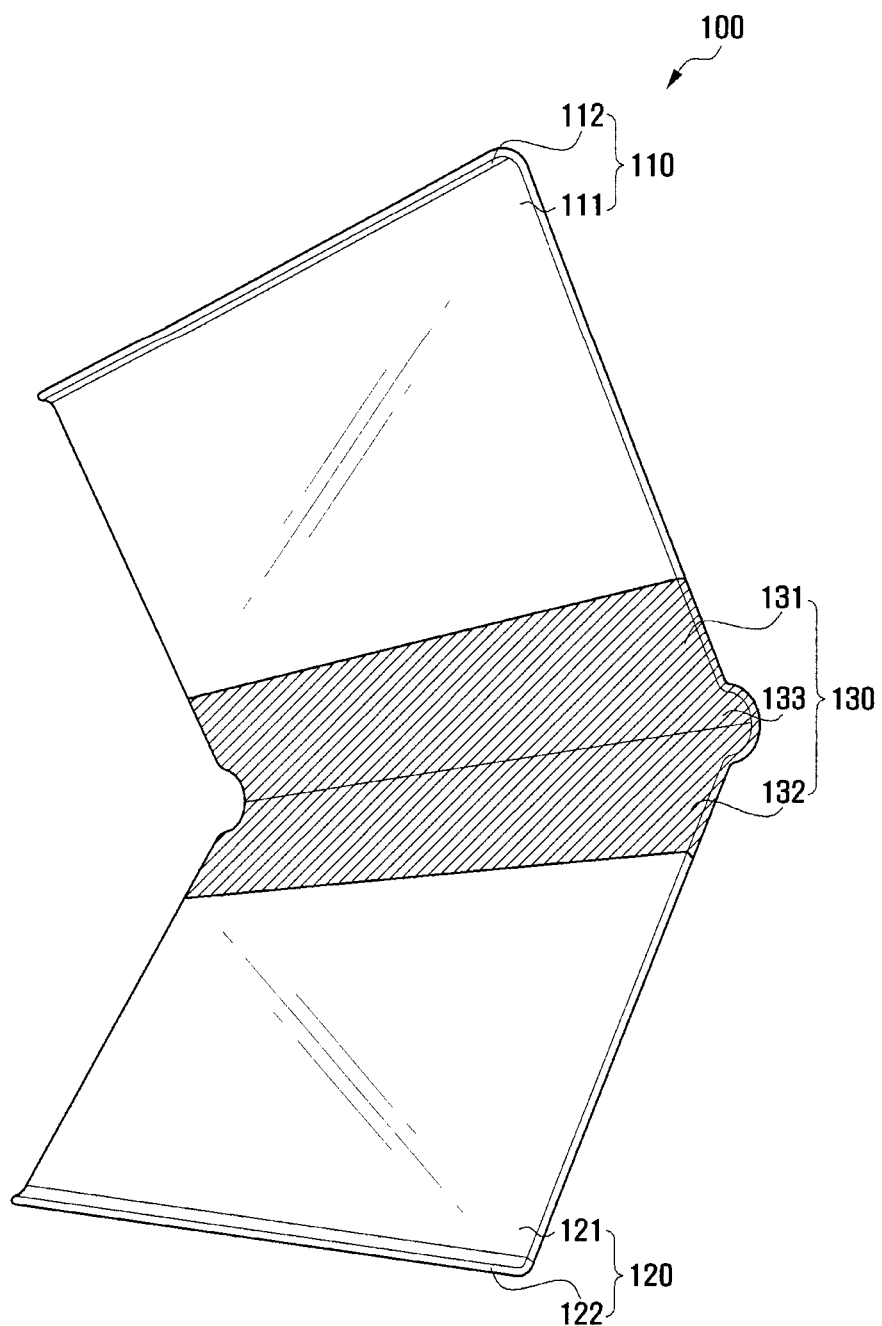
FIG. 2 is a perspective view illustrating a folder type terminal cover device according to an exemplary embodiment of the present invention.

Hereinafter, exemplary embodiments of the present invention are described in detail with reference to the accompanying drawings. The same reference numbers are used throughout the drawings to refer to the same or like parts. The views in the drawings are schematic views only, and are not intended to be to scale or correctly proportioned. For the purposes of clarity and simplicity, detailed descriptions of well-known functions and structures incorporated herein may be omitted to avoid obscuring the subject matter of the present invention.

Referring to FIGS. 1 to 7, a folder type terminal cover device 100 includes a first outer cover 110, second outer cover 120, and hinge cover 130. A folder type terminal cover device can be mounted in the cover device 100. Alternatively, the cover device 100 can be integrated as a part of the folder type terminal.

The first outer cover 110 is an element for covering a first frame 11 of a folder type terminal 10. The first outer cover 110 includes an outer surface cover 111 for covering an outer surface of the first frame 11 and an end portion cover 112 for covering an end portion of the first frame 11.

The second outer cover 120 is an element for covering a second frame 12 of the folder type terminal 10. The second outer cover 120 includes an outer surface cover 121 for covering an outer surface of the second frame 12 and an end portion cover 122 for covering an end portion of the second frame 12.

The hinge cover 130 is an element for covering a hinge 13 area of the folder type terminal 10. The hinge cover 130 includes a first connection portion 131 connected to the first outer cover 110, second connection portion 132 connected to the second outer cover 120, and hinge cover portion 133 for covering the hinge 13.

The first connection portion 131 has a first connection portion end portion 134 positioned between the first outer cover 110 and the first frame 11 to be attached to the first outer cover 110. Similarly, the second connection portion 132 has a second connection portion end portion 135 positioned between the second outer cover 120 and the second frame 12 to be attached to the second outer cover 120.

Figure 3:
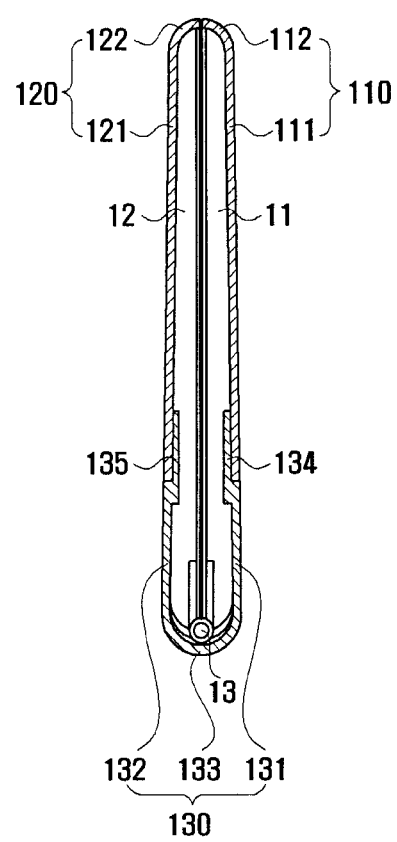
FIG. 3 is a side cross-sectional view illustrating a folded state of a folder type terminal having the folder type terminal cover device of FIG. 2.
Figure 4:
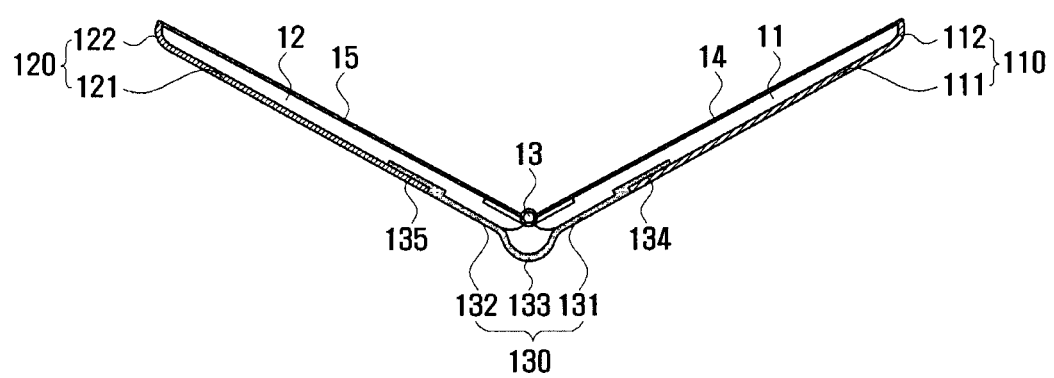
FIG. 4 is a side cross-sectional view illustrating an unfolded state of a folder type terminal having the folder type terminal cover device of FIG. 2.

The hinge cover 130 is formed with a soft material such as rubber, urethane, silicon, leather, and fiber. As shown in FIGS. 3 and 4, in a state where the folder type terminal 10 is folded, the hinge cover portion 133 closely contacts with the hinge 13, and when the folder type terminal 10 is unfolded from a folded state, a distance between the hinge cover portion 133 and the hinge 13 increases.

In the present exemplary embodiment, because the folder type terminal 10 is a symmetrical type, the hinge cover 130 has a symmetrical structure about a shaft of the hinge 13. However, the teachings of the present invention can be applied to a non-symmetrical type terminal.

For reference, the folder type terminal cover device illustrated in FIGS. 3 and 4 is integrally formed with a folder type terminal, but may be detachably formed. In a detachable folder type terminal cover device, an end portion cover of a first outer cover and a second outer cover has a semicircular shape to accommodate or house the folder type terminal therein. Further, by forming a groove in one of the folder type terminal and the folder type terminal cover device and a protruding portion in the other one, the folder type terminal and the folder type terminal cover device may have a structure therebetween so that one end can be inserted into another end.

Figure 6:
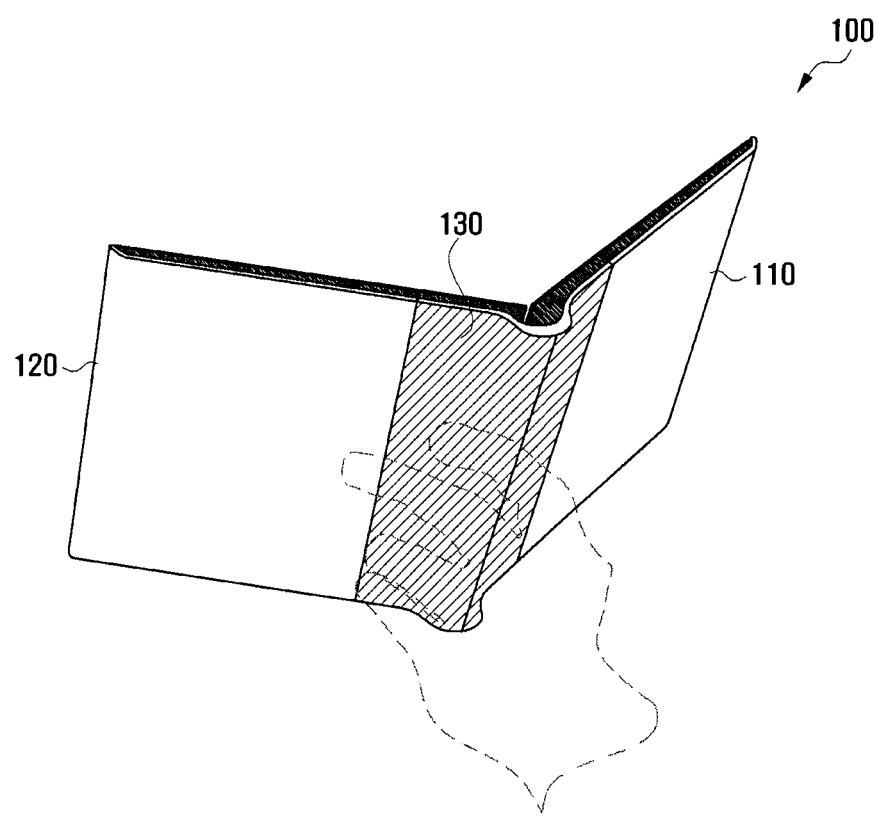
FIG. 6 is a perspective view illustrating a state where a user holds the folder type terminal of FIG. 4.
Figure 7:
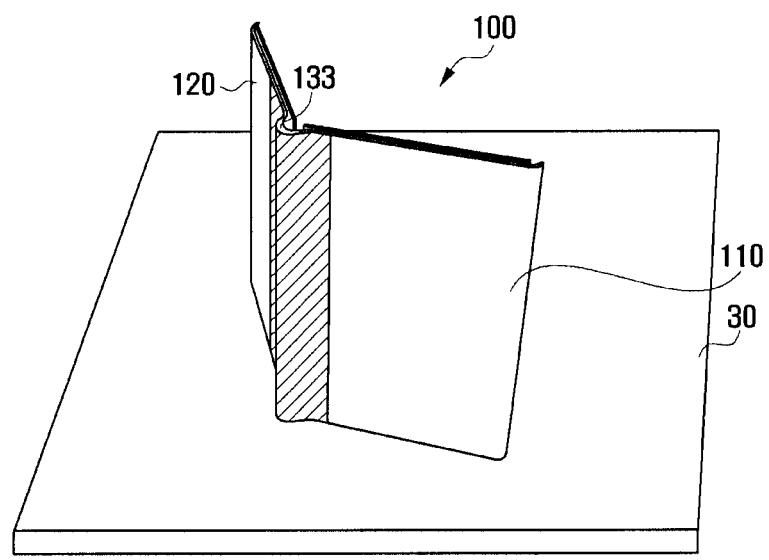
FIG. 7 is a perspective view illustrating a state where the folder type terminal of FIG. 4 vertically stands.

In the present exemplary embodiment, because the hinge cover 130 covers the hinge 13 of the folder type terminal 10, when a user opens and holds the folder type terminal 10 with a hand for reading, as shown in FIG. 6, by preventing the user's hand and the hinge from contacting, the user can receive an improved grip sensation. Further, when the folder type terminal 10 is unfolded from a folded state, a separation distance between the hinge cover portion 133 and the hinge 13 increases, and thus the folder type terminal 10 can stand stably and vertically on a table plane 30 without using a separate device, as shown in FIG. 7. Further, in a state where the folder type terminal 10 is unfolded, because space is formed between the hinge 13 and the hinge cover portion 133, a ventilation effect can be achieve.

Figure 5A:
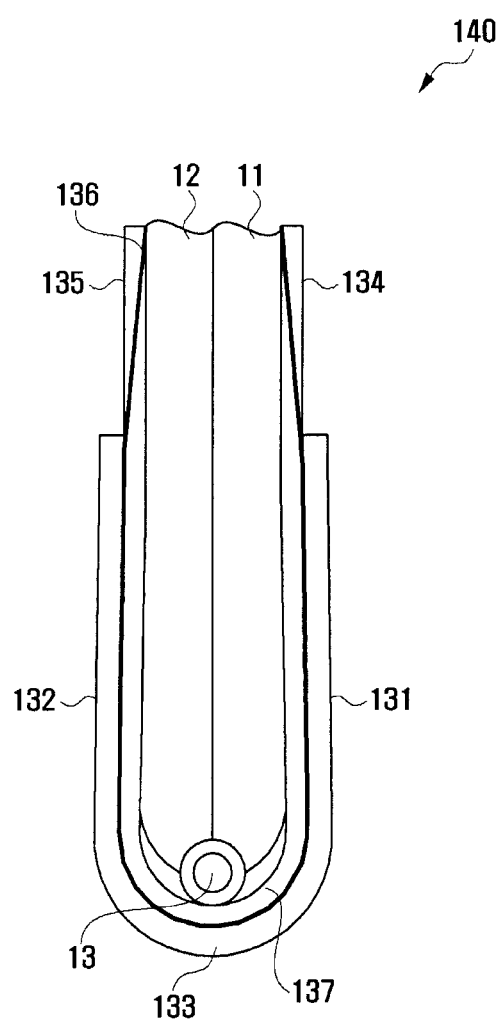
FIG. 5A is a side cross-sectional view illustrating a hinge cover as a modified example of a hinge cover of the folder type terminal cover device of FIG. 3.
Figure 5B:
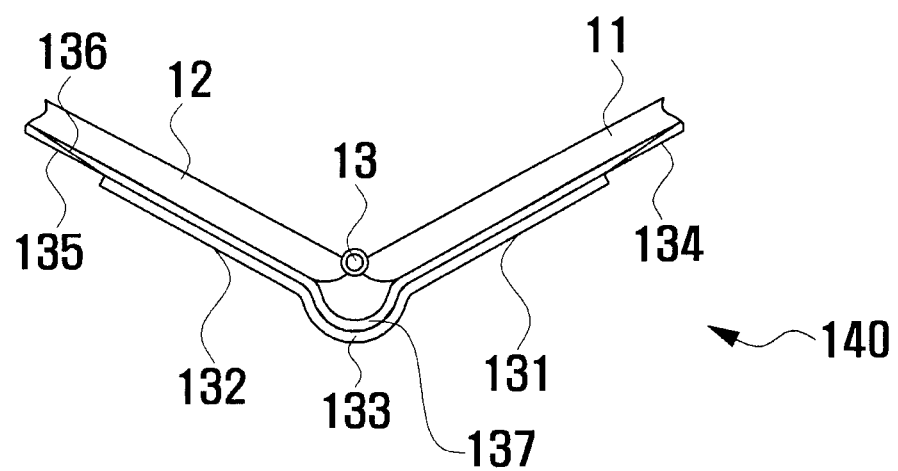
FIG. 5B is a side cross-sectional view illustrating an unfolded state of the hinge cover of FIG. 5A.

Referring to FIGS. 5A and 5B, a hinge cover as a modified embodiment of the hinge cover shown in FIG. 3 is described. A hinge cover 140 of FIG. 5A according to the modified embodiment includes a flat cable protection portion 137 formed integrally with a first connection portion end portion 134 and a second connection portion end portion 135, and positioned at the inside of the hinge cover portion 133 unlike the hinge cover 130 of FIG. 3. Further, a flat cable 136 transmits and receives information between the first frame 11 and the second frame 12 of the folder type terminal 10. The flat cable 136 penetrates the first connection portion end portion 134 and the second connection portion end portion 135, and is disposed between the flat cable protection portion 137 and the hinge cover portion 133. It is preferable that the folder type terminal cover device 100 having the hinge cover 140 is formed integrally with the folder type terminal 10. As shown in FIGS. 5A and 5B, in a state where the hinge cover 140 is folded, the flat cable protection portion 137 closely contacts with the hinge 13, and when the hinge cover 140 is unfolded from a folded state, a distance between the flat cable protection portion 137 and the hinge increases.

Figure 8:
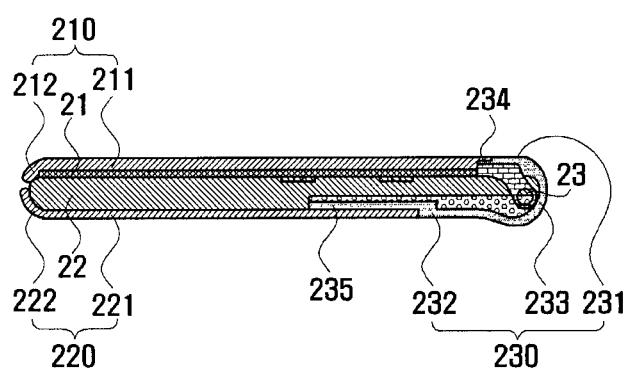
FIG. 8 is a side cross-sectional view illustrating a folded state of a folder type terminal having a folder type terminal cover device according to another exemplary embodiment of the present invention.
Figure 9:
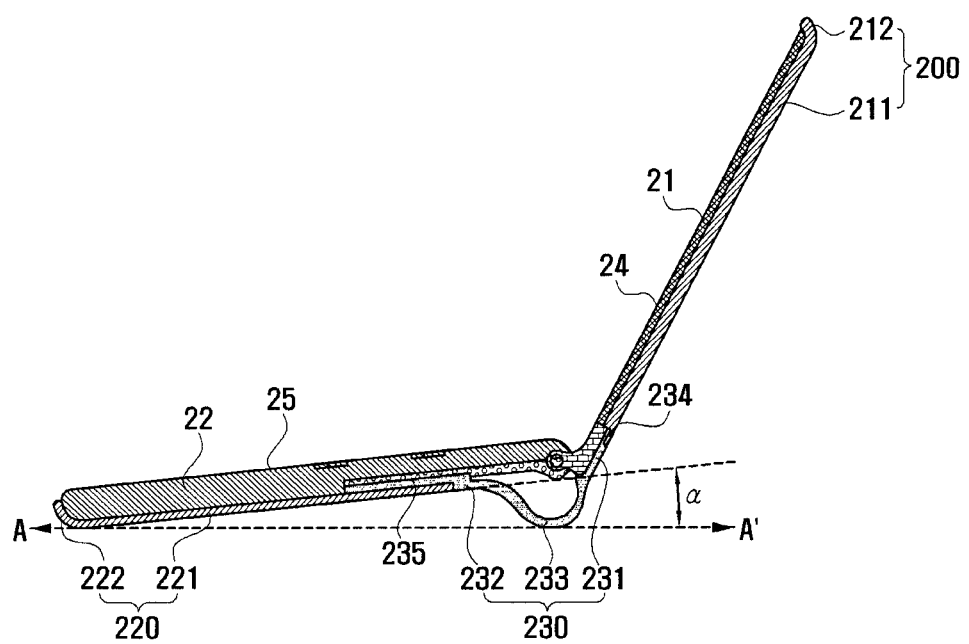
FIG. 9 is a side cross-sectional view illustrating a unfolded state of a folder type terminal having a folder type terminal cover device according to another exemplary embodiment of the present invention.
Figure 10:
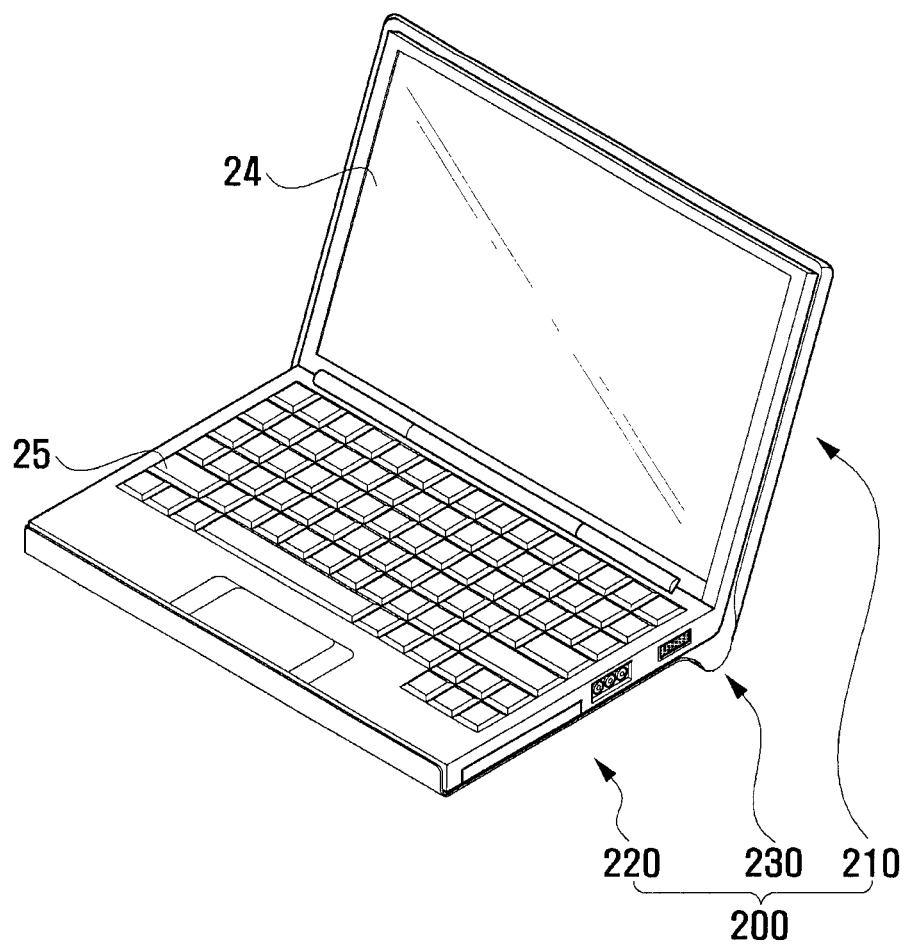
FIG. 10 is a perspective view illustrating the folder type terminal of FIG. 9.

FIG. 8 is a side cross-sectional view illustrating a folded state of a folder type terminal having a folder type terminal cover device according to another exemplary embodiment of the present invention, FIG. 9 is a side cross-sectional view illustrating a unfolded state of a folder type terminal having a folder type terminal cover device according to another exemplary embodiment of the present invention, and FIG. 10 is a perspective view illustrating the folder type terminal of FIG. 9.

Referring to FIGS. 8 to 10, a folder type terminal cover device 200 according to another exemplary embodiment is mounted in an asymmetrical folder type terminal (a folder type terminal having an asymmetrical structure about a hinge shaft), unlike the earlier exemplary embodiment. For example, in the folder type terminal in which the folder type terminal cover device 200 is mounted, a screen 24 is formed in a first frame 21, however a manipulation unit 25 such as a keyboard is formed in a second frame 22.

In a hinge cover 230, a length in which a second connection portion 232 is extended to the second frame 22 is greater than a length in which a first connection portion 231 is extended to the first frame 21. Accordingly, as shown in FIG. 9, when the folder type terminal is put on a table plane in an unfolded state, the second frame 22 in which the manipulation unit 25 is formed can maintain a predetermined angle α from a table plane A-A'. Therefore, compared with when the second frame 22 is put parallel to the table plane A-A', the user can manipulate the manipulation unit 25 in a more comfortable posture, and also a ventilation effect due to space between the table plane A-A' and the second frame 22 can be obtained.

The folder type terminal cover device according to the present exemplary embodiment has the same configuration as that of the foregoing exemplary embodiment, except for the above-described configuration, thus discussion of similar components are omitted to avoid redundancy.

As described above, according to the present invention, because a hinge cover covers a hinge of a folder type terminal, an appearance and grip sensation of the folder type terminal can be improved. Further, when the folder type terminal is unfolded from a folded state, a separation distance between the hinge cover and the hinge increases, and thus when the folder type terminal is put on a table in an unfolded state, the folder type terminal can maintain a predetermined angle from a table plane without a separate device.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A terminal cover for covering a folder type terminal comprising a first frame, a second frame, and a hinge for rotatably connecting the first frame and the second frame, comprising:
    a first outer cover for covering the first frame;
    a second outer cover for covering the second frame; and
    a hinge cover, coupled to the first and second outer covers, for covering the hinge,
    wherein a separation distance, between the hinge cover and the hinge increases when the folder type terminal is unfolded from a folded state wherein the hinge cover comprises a first connection portion coupled to the first outer cover, a second connection portion coupled to the second outer cover, and the first connection portion having a first connection portion end positioned coupled to at least one of the first outer cover and the first frame to be attached to the first outer cover.

2. The terminal cover device of claim 1, wherein the first outer cover comprises an end portion cover for covering an end portion of the first frame.

3. The terminal cover device of claim 1, wherein the second outer cover comprises an end portion cover for covering an end portion of the second frame.

4. The terminal cover device of claim 1, wherein the first connection portion end is positioned between the first outer cover and the first frame to be attached to the first outer cover.

5. The terminal cover device of claim 1, wherein the second connection portion has a second connection portion end positioned between the second outer cover and the second frame to be attached to the second outer cover.

6. The terminal cover device of claim 1, wherein a length in which the second connection portion is extended to the second frame is greater than a length in which the first connection portion is extended to the first frame.

7. The terminal cover device of claim 6, wherein when the folder type terminal is unfolded and displaced substantially in a horizontal orientation, the second frame stably maintains a predetermined angle relative to the horizontal orientation for viewing.

8. The terminal cover device of claim 1, wherein the separation distance between the hinge cover and the hinge defines a ventilation space.

9. The terminal cover device of claim 1, when during the unfolded state, the folder type terminal stably stands substantially in a vertical orientation for viewing.

10. The terminal cover device of claim 1, the hinge cover is formed with a soft material for providing a grip sensation and includes one of rubber, urethane, silicon, leather, and fiber.

11. The terminal cover device of claim 1, wherein the folder type terminal is a symmetrical type terminal.

12. The terminal cover device of claim 1, wherein the folder type terminal is a non-symmetrical type terminal.

13. The terminal cover device of claim 1, wherein the hinge cover comprises a circular shape.

14. A terminal cover for covering a folder type terminal comprising a first frame, a second frame, and a hinge for rotatably connecting the first frame and the second frame, comprising:
   a first outer cover for covering the first frame;
   a second outer cover for covering the second frame; and
   a hinge cover, coupled to the first and second outer covers, for covering the hinge,
   wherein a separation distance, between the hinge cover and the hinge increases when the folder type terminal is unfolded from a folded state wherein the hinge cover comprises a first flat cable protection portion positioned at the inside of the hinge cover and a second flat cable positioned between the flat cable protection portion and the hinge cover.

15. A terminal cover for covering a folder type terminal comprising a first frame, a second frame, and a hinge for rotatably connecting the first frame and the second frame, comprising:
   a first outer cover for covering the first frame;
   a second outer cover for covering the second frame; and
   a hinge cover, coupled to the first and second outer covers, for covering the hinge,
   wherein a separation distance, between the hinge cover and the hinge increases when the folder type terminal is unfolded from a folded state wherein the hinge cover comprises a first cable protection portion positioned at the inside of the hinge cover and a second cable positioned between the cable protection portion and the hinge cover.

* * * * *